Dec. 13, 1966   C. W. HATCHER   3,291,532
PAVEMENT SLOTTING APPARATUS
Filed May 11, 1964   5 Sheets-Sheet 1

INVENTOR.
CECIL W. HATCHER

BY HIS ATTORNEYS.
HARRIS, KIECH, RUSSELL & KERN

Dec. 13, 1966  C. W. HATCHER  3,291,532
PAVEMENT SLOTTING APPARATUS
Filed May 11, 1964  5 Sheets-Sheet 5

INVENTOR.
CECIL W. HATCHER

BY HIS ATTORNEYS.
HARRIS, KIECH, RUSSELL & KERN

United States Patent Office 3,291,532
Patented Dec. 13, 1966

3,291,532
PAVEMENT SLOTTING APPARATUS
Cecil W. Hatcher, West Covina, Calif., assignor to Concut, Inc., El Monte, Calif., a corporation of California
Filed May 11, 1964, Ser. No. 366,499
15 Claims. (Cl. 299—39)

The present invention relates in general to a pavement grooving or slotting apparatus and, more particularly, to an apparatus for slotting a strip of concrete pavement along a line paralleling and lying substantially midway between the longitudinal edges of such strip.

As background, attention is directed to the longitudinal pavement slotting apparatus disclosed in my Patent No. 3,007,688, granted November 7, 1961. A general object of the present invention is to provide an apparatus which incorporates various improvements on that disclosed in the patent mentioned.

More particularly, an important object of the present invention is to provide a pavement slotting machine which comprises a wheeled vehicle having a driving front wheel means and a trailing rear wheel means each laterally symmetrical with respect to the longitudinal centerline of the vehicle, and which includes tandem rotary slotting blades spaced apart along the longitudinal centerline of the vehicle. The provision of tandem slotting blades on the longitudinal centerline of a vehicle having a front wheel drive minimizes deviations from a straight line in the over-all slot cut by the tandem blades, and insures that each trailing blade will follow closely the slot cut by the blale ahead of it, which are important features of the invention.

Another important object of the invention is to provide a pavement slotting machine of the foregoing nature which includes means for quickly and easily varying the depths of cut of the respective tandem slotting blades in the same or different proportions.

A more specific object of the invention in the immediately-preceding connection is to provide a pavement slotting machine which includes: a wheeled vehicle having a main frame carried by front and rear wheel frames respectively having front and rear wheel means mounted thereon; the front and rear ends of the main frame being independently movable vertically relative to the front and rear wheel frames, respectively; means for adjusting the vertical position of the front end of the main frame relative to the front wheel frame; adjustable means for limiting downward movement of the rear end of the main frame relative to the rear wheel frame; tandem rotary slotting blades mounted on the main frame; and actuating means interconnecting the rear wheel frame and the rear end of the main frame for lowering and raising the rear end of the main frame to engage the rotary slotting blades with and disengage them from the pavement.

Still another important object of the invention is to provide means for automatically guiding the aforementioned wheeled vehicle along a strip of pavement with the tandem rotary slotting blades a constant distance from one edge of the strip of pavement. More particularly, an object in this connection is to provide a steerable wheeled vehicle which is adapted to push a guide means along the strip of pavement, and which is steered by the guide means in such a manner as to constantly maintain a guide wheel means on the guide means in engagement with one of the longitudinal edges of the strip of pavement, or a form abutting such longitudinal edge. For convenience, such a form, if present, will be regarded herein as constituting the corresponding longitudinal edge of the strip of pavement.

Still another object in the immediately-preceding connection is to provide an apparatus for longitudinally slotting a strip of pavement intermediate the longitudinal edges thereof, and a substantially constant distance from one such longitudinal edge, which includes: guide means transversely spanning the strip of pavement and movable longitudinally therealong in a predetermined direction and provided with two guide wheel means respectively engageable with the longitudinal edges of the strip of pavement; a wheeled vehicle movable longitudinally along the strip of pavement behind the guide means and including frame means supported by front and rear wheel means engageable with the strip of pavement; the vehicle having a longitudinal centerline and each of the wheel means being laterally symmetrical with respect to the longitudinal centerline; the front wheel means being a driving wheel means for propelling the vehicle along the strip of pavement in the direction, and also being a steerable wheel means; tandem rotary slotting blades carried by the frame means for rotation about transverse horizontal axes and spaced apart along the longitudinal centerline of the vehicle; actuating means for moving the rotary slotting blades vertically into and out of slotting engagement with the strip of pavement; a motor carried by the frame means; means providing driving connections from the motor to the front wheel means, the rotary slotting blades and the actuating means; pusher means interconnecting the frame means and the guide means for causing the vehicle to push the guide means longitudinally along the strip of pavement in the direction; and steering means interconnecting the guide means and the front wheel means for steering the front wheel means in a direction to cause one of the guide wheel means to bear against the corresponding longitudinal edge of the strip of pavement, or a form abutting same.

The foregoing objects, advantages, features and results of the present invention, together with various other objects, advantages, features and results thereof which will be evident to those skilled in the pavement slotting art in the light of this disclosure, may be achieved with the exemplary embodiment of the invention described in detail hereinafter and illustrated in the accompanying drawings, in which:

*Pavement slotting machine 10*

Referring primarily to FIGS. 1 to 5 of the drawings, the pavement slotting machine of the invention is designated generally therein by the numeral 10 and includes a wheeled vehicle 12 having a frame means 14 supported by front and rear wheel means 16 and 18 engageable with pavement 20 to be slotted. The front and rear wheel means 16 and 18 are laterally symmetrical with respect to the longitudinal centerline 22, FIG. 2, of the machine 10. In the particular construction illustrated, the front wheel means 16 includes two front wheels 26 respectively located on opposite sides of and equidistant from the longitudinal centerline 22, and the rear wheel means 18 similarly includes two rear wheels 28 respectively located on opposite sides of and equidistant from the longitudinal centerline of the machine.

The frame means 14 includes a main frame 34 carried by front and rear wheel frames 36 and 38 respectively having the front and rear wheels 26 and 28 mounted thereon. The front and rear ends of the main frame 34 are independently vertically adjustable relative to the front and rear wheel frames 36 and 38, as will be described in detail hereinafter. As will also be described in more detail later, the rear end of the main frame 34 is vertically movable to raise and lower tandem rotary slotting blades 134 into and out of slotting engagement with the pavement 20, these blades being located on the longitudinal centerline 22 of the vehicle 12 and being adapted to cut a slot 32 in the pavement.

The front wheels 26 are steerably mounted on the front wheel frame 36 in a manner not specifically shown, but well known in the art. For steering purposes, tie rods 40 are pivotally connected to the front wheels 26 and are pivotally interconnected at their inner ends, at 42. One of the tie rods 40 provides a steering arm 44 having pivotally connected thereto one arm 46 of a bell crank 48. The latter is pivotally mounted on the front wheel frame 36, at 50, for horizontal swinging movement of the arm 46 thereof so as to steer the front wheels 26 through the steering arm 44 and the tie rods 40. The other arm, 52, of the bell crank 48 has a steering lever 54 pivotally connected thereto, the steering lever being pivotally mounted on the front wheel frame 36 at a point accessible from the main frame 34.

The front wheels 26, in addition to being steerable, as just described, are also driving wheels for propelling the vehicle 12 over the pavement 20 to be slotted. For this purpose, a hydraulic motor 60 is mounted on the front wheel frame 36 and drives the input shaft of a variable-speed transmission 62 through a suitable connection 64. The transmission 62 is also mounted on the front wheel frame 36. The latter carries suitable means, not shown in detail, for driving the two front wheels 26, such driving means being connected to the output shaft of the transmission 62 by a chain drive 66.

Figure 6:
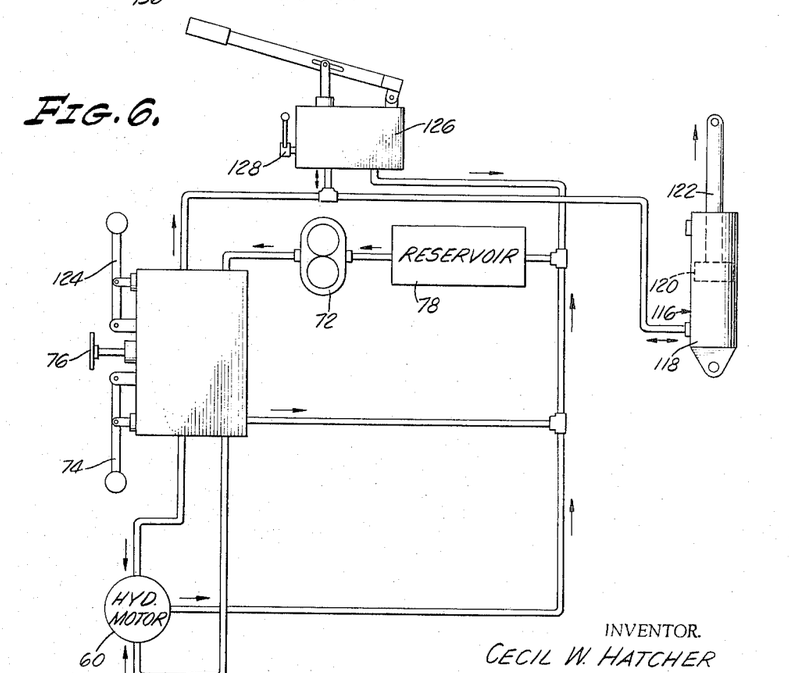
FIG. 6 is a schematic diagram of the hydraulic system incorporated in the machine of FIGS. 1 to 5.

The main frame 34 carries a suitable motor, preferably an internal combustion engine 70, which drives a hydraulic pump 72. As shown in FIG. 6, the hydraulic pump 72 is connected to the hydraulic motor 60 for driving the front wheels 26, through a control valve 74, which determines the direction of travel of the vehicle 12, and a metering valve 76, which regulates the speed of the vehicle. As will be apparent from FIG. 6, the hydraulic system incorporated in the machine 10 is a closed system which includes a reservoir 78 to which the inlet of the hydraulic pump 72 is connected.

Figure 1:
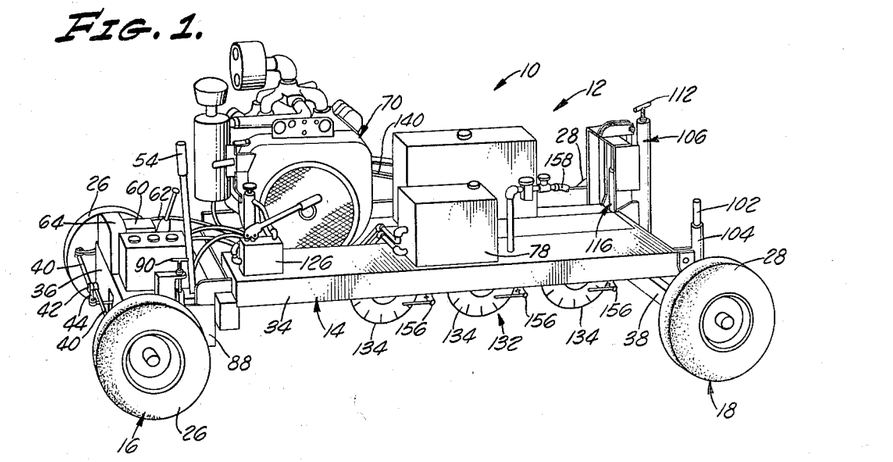
FIG. 1 is a perspective view of a pavement slotting machine of the invention.
Figure 2:
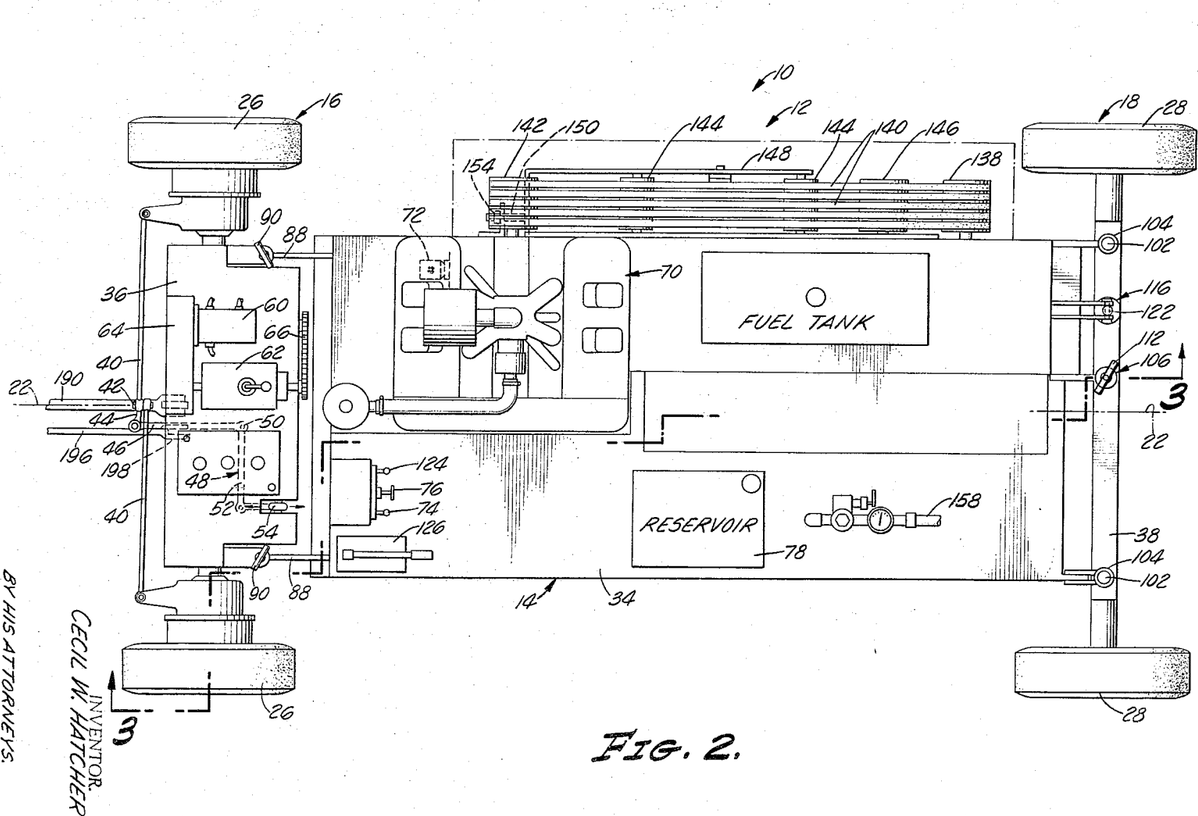
FIG. 2 is an enlarged top plan view of the machine shown in FIG. 1.
Figure 3:
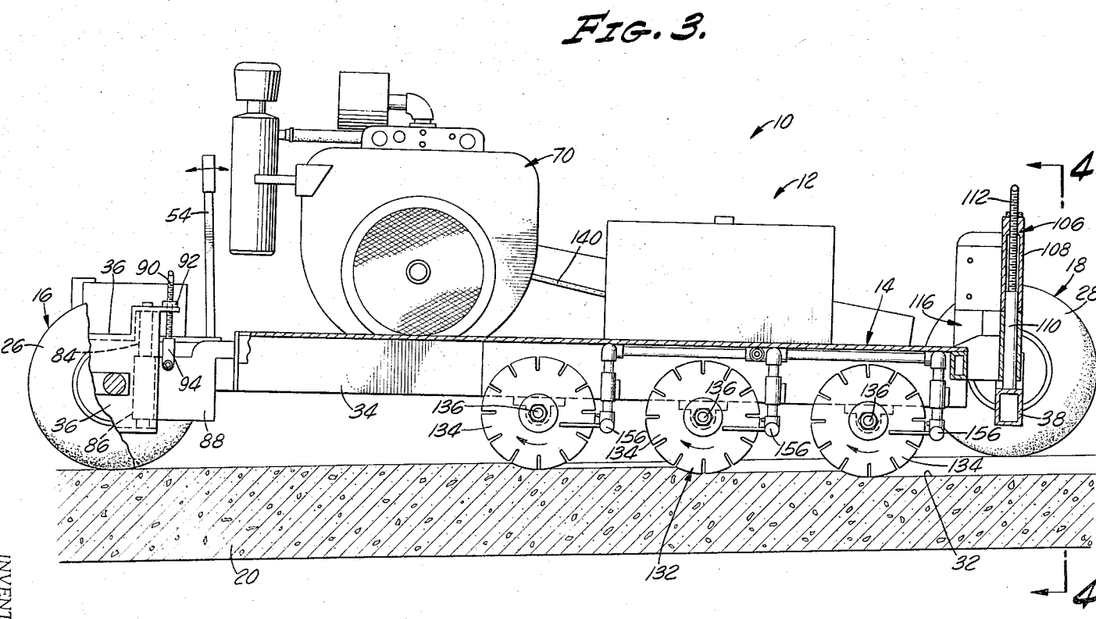
FIG. 3 is a longitudinal sectional view taken approximately along the arrowed line 3—3 of FIG. 2.
Figure 4:
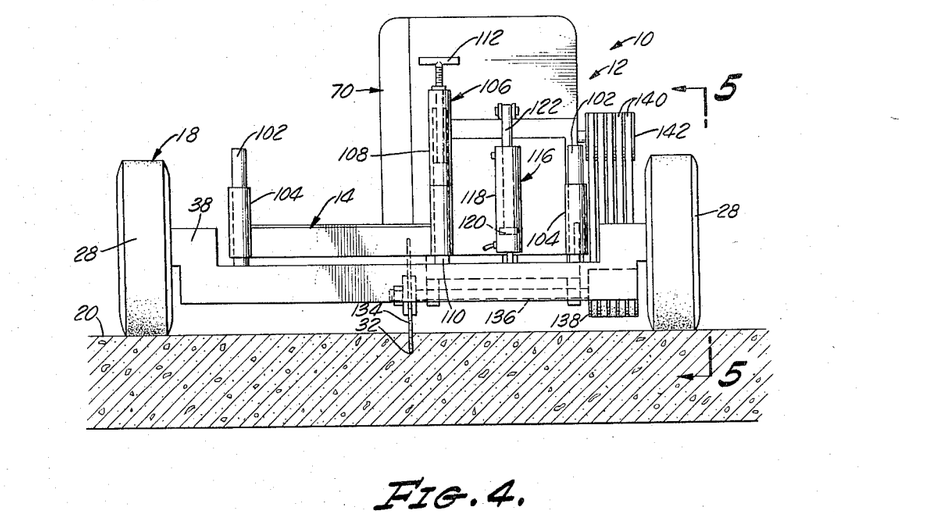
FIG. 4 is a rear elevational view taken as indicated by the arrowed line 4—4 of FIG. 3.

As best shown in FIGS. 2 and 3, the front wheel frame 36 is provided thereon with laterally-spaced upright guides 84. Slidable upwardly and downwardly on the respective guides 84 are sleeves 86 carried by forwardly-projecting arms 88 on the front end of the main frame 34. With this construction, the elevation of the front end of the main frame 34 may be adjusted. The desired elevation adjustment is achieved by means of screws 90 respectively located adjacent the guides 84. Each screw 90 is threadedly engaged with a nut 92 suitably supported on the front wheel frame 36, and is rotatably engaged with a clevis 94 pivotally connected to the corresponding arm 88 on the main frame 34. As will be apparent, by rotating the screws 90 in the proper directions, the front end of the main frame 34 can be raised and lowered relative to the front wheel frame 36.

The rear wheel frame 38, which is simply a rigid transverse axle, is provided thereon with upright guides 102 for sleeves 104 on the rear end of the main frame 34.

The lowermost position of the rear end of the main frame 34 relative to the rear wheel frame 38 is determined by an adjustable stop means 106 which includes an upright cylinder 108 mounted on the rear end of the main frame 34. Projecting upwardly from the rear wheel frame 38 into the cylinder 108 is an upright 110. Extending upwardly from the upper end of the upright 110 is an adjusting screw 112 which threadedly engages the upper end of the cylinder 108. The lower end of the upright 110 merely bears against the rear wheel frame 38, the upper end of this upright being connected to the adjusting screw 112. Thus, the lowermost position of the rear end of the main frame 34 relative to the rear wheel frame 38 may be adjusted by appropriately rotating the adjusting screw 112. This adjustment determines the total depth of the slot 32 formed by the blades 134, as will be discussed in more detail hereinafter.

The machine 10 includes an actuating means 116 for moving the rear end of the main frame 34 upwardly from its adjusted lowermost position to lift the blades 134 clear of the pavement 20 for transport or maneuvering purposes. The actuating means 116 includes a hydraulic motor of the reciprocating type comprising a cylinder 118 pivotally connected to the rear wheel frame 38 and a piston 120 having an upwardly extending piston rod 122 pivotally connected to the rear end of the main frame 34. As will be apparent, by introducing hydraulic fluid under pressure in the cylinder 118 below the piston 120, the rear end of the main frame 34 may be elevated above its adjusted lowermost position. As shown in FIG. 6 of the drawings, the actuating means 116 is supplied with hydraulic fluid from the hydraulic motor 60 by a control valve 124.

It will be noted that, in addition to the components hereinbefore described, the hydraulic circuit of the machine 10 includes an auxiliary pump 126 incorporating a control valve 128. The purpose of the auxiliary pump 126 is to actuate the hydraulic motor 116 when the engine 70 is not running. The control valve 128 may be opened to release the pressure beneath the piston 120 to lower the rear end of the main frame 34.

The machine 10 includes a pavement grooving or slotting means 132 carried by the main frame 34 adjacent the rear end thereof. The pavement slotting means 132 is located on the longitudinal centerline 22 of the machine 10 and comprises the tandem rotary slotting blades 134, shown as three in number, rotatable about transverse horizontal axes and longitudinally spaced apart along the longitudinal centerline 22. As is well known in the pavement slotting art, the rotary slotting blades 134 are provided with abrasive peripheries.

Figure 5:
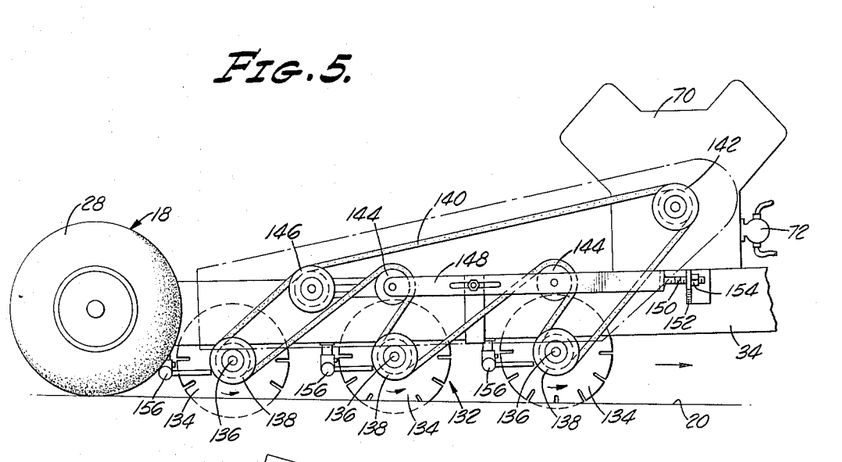
FIG. 5 is a fragmentary side elevation view taken as indicated by the arrowed line 5—5 of FIG. 4.

Considering the pavement slotting means 132 in more detail, the blades 134 are carried by longitudinally spaced, transversely extending, horizontal arbors 136 mounted in suitable bearings. Each blade 134 is rigidly mounted on one end of the corresponding arbor 136 and, as previously indicated, is located on the longitudinal centerline 22 of the machine 10. The other end of each arbor 136 carries sheaves 138 having endless belts 140 trained therearound. These belts are also trained around driving sheaves 142 driven by the engine 70, and around two sets of idler sheaves 144. The belts 140 are also trained over a third set of idler sheaves 146. As best shown in FIG. 5 of the drawings, the endless belts 140 are trained back and forth over the arbor sheaves 138 and the idler sheaves 144 and 146 in serpentine or zigzag fashion. The set of idler sheaves 146 is mounted directly on the main frame 34, while the two sets of idler sheaves 144 are mounted on an auxiliary frame 148. The latter, as will be apparent from FIG. 5 of the drawings, is movably mounted on the main frame 34 to adjust the tension in the belts 140. The auxiliary frame 148 carries a threaded stud 150 which projects forwardly through a bracket 152 on the main frame 34 and which has a nut 154 threaded thereon on the opposite side of such bracket. As will be clear from FIG. 5, the nut 154 may be rotated to shift the auxiliary frame 148 forwardly relative to the main frame 34 to increase the tension in the belts 140.

Spray units 156 are mounted on the main frame 34 adjacent the respective rotary slotting blades 134 to spray water, or other cooling and lubricating fluid, on the blades. The spray units 156 are manifolded together and may be supplied with water through a hose 158, FIG. 1, leading from a suitable source of supply.

It will be noted from the directional arrows on the blades 134 in FIGS. 3 and 5 of the drawings that these blades are driven in such a direction that they cut forwardly and upwardly. This is important because it results in a much smoother slot than downward and rearward cutting.

Operation of pavement slotting machine 10

It is thought that the over-all operation of the machine 10 will be clear from the foregoing description of the structure of the machine. Consequently, this explanation of the operation of the machine 10 will be directed primarily to various important advantages arising from the particular structure disclosed.

One important feature of the invention resides in the provision of the front driving wheels 26 in conjunction with the tandem rotary slotting blades 134 on the longitudinal centerline 22 of the machine. This construction is important because it insures that the intermediate and rear slotting blades 134 follow precisely the slot cut by the preceding blade or blades. Not only does this insure a sharp and well-defined slot in the pavement 20, but it also prevents potentially-damaging side loads on the blade or blades which run in the slot formed by the preceding blade or blades.

Expressed differently, utilizing a front drive in conjunction with tandem blades on the longitudinal centerline insures that the tandem blades will follow a straight line much more accurately than with a rear wheel drive and/or with tandem blades laterally offset from the longitudinal centerline.

Another important feature results from making the front end of the main frame 34 vertically adjustable in conjunction with a depth adjustment for the rear end of the main frame. As will be apparent from FIG. 3 of the drawings, the adjustable stop means 106 varies the total depth of cut and proportionately varies the depth increments cut by the respective blades 134. If it is desired to vary the proportions of the increments cut by the respective blades 134, this may be accomplished by means of the adjusting screws 90 for controlling the elevation of the front end of the main frame 34 relative to the front wheel frame 36. In other words, the front adjusting means constituted by the adjusting screw 90 provides a way of varying the relative depths of cut of the rotary slotting blades 134.

It will be noted that the pavement slotting machine 10 may be guided along the desired path by means of the steering lever 54. An alternate means of guiding the machine 10 along a predetermined path automatically will be described hereinafter.

It will also be noted that the pavement slotting blades 134 may be lifted clear of the pavement whenever desired simply by energizing the actuating means 116. When this actuating means is deenergized, the weight of the main frame 34 and the components carried thereby automatically causes the pavement slotting means 132 to slot the pavement 20 to the preselected depth for which the adjustable stop means 106 is set.

Automatic pavement slotting apparatus 170

Figures 7, 8, 9:
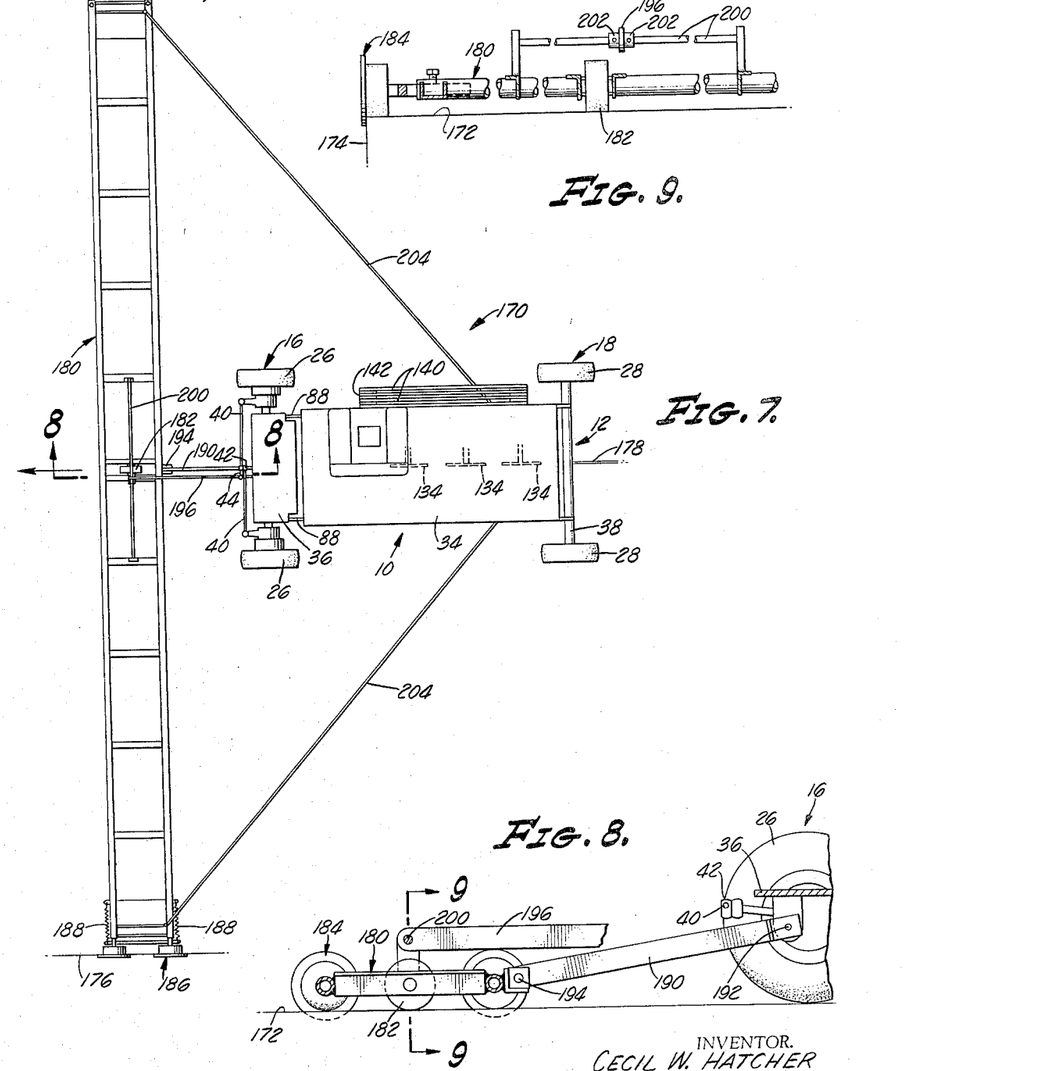
FIG. 7 is a top plan view of an apparatus for longitudinally slotting a strip of pavement intermediate the longitudinal edges thereof, which apparatus includes the pavement slotting machine of FIGS. 1 to 6.
FIG. 8 is an enlarged, fragmentary longitudinal sectional view taken as indicated by the arrowed line 8—8 of FIG. 7.
FIG. 9 is a fragmentary sectional view taken as indicated by the arrowed line 9—9 of FIG. 8 of the drawings.

Turning now to FIGS. 7 to 9 of the drawings, illustrated therein is an apparatus 170 for longitudinally slotting a concrete pavement strip intermediate the longitudinal edges 174 and 176 thereof. More particularly, the apparatus 170 cuts a longitudinal slot 178 in the pavement strip 172 a constant distance from the longitudinal edge 174 in the particular construction illustrated, such constant distance being substantially one-half the width of the strip.

Considering the apparatus 170 in more detail, it includes a wheeled guide means or frame 180 transversely spanning the pavement strip 172 and movable longitudinally therealong, the direction of movement being from right to left as viewed in FIG. 7 of the drawings. The guide frame 180 is supported by an intermediate wheel means 182, shown as consisting of a single wheel, and by two guide wheel means 184 and 186 respectively engageable in guiding relation with the longitudinal edges 174 and 176 of the pavement strip 172 (or with the forms used in pouring such strip). In the particular construction illustrated, each of the guide wheel means 184 and 186 includes two longitudinally spaced guide wheels having flanges engageable with the corresponding longitudinal edge in the pavement strip, or an abutting form. Preferably, the two guide wheel means 184 and 186 are adjustably connected to the guide frame 180 in such a manner that the lateral spacing of the two guide wheel means may be varied to accommodate different pavement strip widths. Additionally, one of the guide wheel means, i.e., the guide wheel means 186, is spring biased toward the other, as indicated at 188, to accommodate minor variations in the width of the particular pavement strip being longitudinally slotted.

The slotting machine 10 forms part of the slotting apparatus 170 and is located behind the guide frame 180. The slotting machine 10, as will be described, pushes the guide frame 180 along the pavement strip 172, and, in turn, is guided along the pavement strip by the guide frame. Further, the guide frame 180 and the slotting machine 10 may be interconnected in steering relation in such a manner that the guide wheel means 184 is constantly biased laterally against the corresponding edge 174 of the pavement strip 172. This insures longitudinally slotting the pavement strip 172 a constant distance from the longitudinal edge 174.

Considering how the foregoing is accomplished, the front wheel frame 36 of the slotting machine 10 is connected to the guide frame 180 by a thrust or pusher bar 190. This pusher bar is pivotally connected to the front wheel frame 36 of the machine 10 and to the guide frame 180 at 192 and 194, respectively, as best shown in FIG. 8 of the drawings.

A longitudinal steering bar 196 is suitably connected at its rearward end, as indicated at 198 in FIG. 2 of the drawings, to the arm 46 of the bell crank 48. The forward end of the steering bar 196 is provided with a hole receiving therein a transverse rod 200 on the guide frame 180. The front end of the steering bar 196 may be locked in any desired transverse position on the rod 200 by means of locking collars 202, FIG. 9.

To minimize any tendency of the slotting machine 10 to weave, diagonal braces 204 are connected at their outer, forward ends to the guide frame 180 adjacent the respective ends thereof. The inner, rearward ends of the braces 204 are connected to the main frame 34 of the slotting machine 10 adjacent the rear end thereof. Preferably, the braces 204 are simply guy wires.

In operation, the slotting machine 10 pushes the guide frame 180 along the pavement strip 172 through the medium of the pusher bar 190. At the same time, the guide wheel means 184 and 186 guide both the frame 180 and the slotting machine 10 along the desired path. The forward end of the steering bar 196 is so positioned on the rod 200 as to steer the slotting machine 10 in a direction to cause the guide wheel means 184 to bear firmly against the corresponding longitudinal edge 174 of the pavement strip 172. (It will be understood that only a very slight inclination of the steerable front wheels 26 is necessary to achieve this.) Consequently, the slotting machine 10 is caused to longitudinally slot the pavement strip 172 a constant distance from the longitudinal edge 174 of the strip.

Once the apparatus 170 is adjusted properly, it can be permitted to operate automatically with only occasional attention, thus freeing the operator thereof for other duties, which is an important feature of the invention.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:
1. In a pavement slotting machine, the combination off:
   (a) a wheeled vehicle including frame means supported by front and rear wheel means engageable with the pavement;
   (b) said vehicle having a longitudinal centerline and each of said wheel means being laterally symmetrical with respect to said longitudinal centerline;
   (c) said front wheel means being a driving wheel means for propelling said vehicle over the pavement with said rear wheel means trailing said front wheel means;
   (d) tandem rotary slotting blades carried by said frame means for rotation about transverse horizontal axes and spaced apart along said longitudinal centerline of said vehicle;
   (e) actuating means for moving said rotary slotting blades vertically into and out of slotting engagement with the pavement;
   (f) a motor carried by said frame means; and
   (g) means providing driving connections from said motor to said front wheel means, said rotary slotting blades and said actuating means.

2. In a pavement slotting machine, the combination of:
   (a) a wheeled vehicle including frame means supported by front and rear wheel means engageable with the pavement;
   (b) said vehicle having a longitudinal centerline and each of said wheel means being laterally symmetrical with respect to said longitudinal centerline;
   (c) said front wheel means being a driving wheel means for propelling said vehicle over the pavement with said rear wheel means trailing said front wheel means;
   (d) one of said wheel means being a steerable wheel means;
   (e) tandem rotary slotting blades carried by said frame means for rotation about transverse horizontal axes and spaced apart along said longitudinal centerline of said vehicle;
   (f) actuating means for moving said rotary slotting blades vertically into and out of slotting engagement with the pavement;
   (g) a motor carried by said frame means;
   (h) means providing driving connections from said motor to said front wheel means, said rotary slotting blades and said actuating means; and
   (i) means for steering said steerable wheel means.

3. In a pavement slotting machine, the combination of:
   (a) a wheeled vehicle including frame means supported by front and rear wheel means engageable with the pavement;
   (b) said vehicle having a longitudinal centerline and each of said wheel means being laterally symmetrical with respect to said longitudinal centerline;
   (c) said front wheel means being a driving wheel means for propelling said vehicle over the pavement with said rear wheel means trailing said front wheel means;
   (d) said front wheel means being a steerable wheel means;
   (e) tandem rotary slotting blades carried by said frame means for rotation about transverse horizontal axes and spaced apart along said longitudinal centerline of said vehicle;
   (f) actuating means for moving said rotary slotting blades vertically into and out of slotting engagement with the pavement;
   (g) a motor carried by said frame means;
   (h) means providing driving connections from said motor to said front wheel means, said rotary slotting blades and said actuating means; and
   (i) means for steering said front wheel means.

4. In a pavement slotting machine, the combination of:
   (a) a wheeled vehicle including frame means supported by front and rear wheel means engageable with the pavement;
   (b) said vehicle having a longitudinal centerline and each of said wheel means including two wheels symmetrically disposed with respect to said longitudinal centerline;
   (c) said front wheel means being a driving wheel means for propelling said vehicle over the pavement with said rear wheel means trailing said front wheel means;
   (d) tandem rotary slotting blades carried by said frame means for rotation about transverse horizontal axes and spaced apart along said longitudinal centerline of said vehicle;
   (e) actuating means for moving said rotary slotting blades vertically into and out of slotting engagement with the pavement;
   (f) a motor carried by said frame means; and
   (g) means providing driving connections from said motor to said front wheel means, said rotary slotting blades and said actuating means.

5. In a pavement slotting machine, the combination of:
   (a) a wheeled vehicle including frame means supported by front and rear wheel means engageable with the pavement;
   (b) said frame means including a main frame carried by front and rear wheel frames respectively having said front and rear wheel means mounted thereon;
   (c) the front and rear ends of said main frame being independently movable vertically relative to said front and rear wheel frames, respectively;
   (d) means for adjusting the vertical position of one end of said main frame relative to the corresponding one of said wheel frames;
   (e) adjustable means for limiting downward movement of the other end of said main frame relative to the other of said wheel frames;
   (f) tandem rotary slotting blades mounted on said main frame for rotation about transverse horizontal axes and spaced apart longitudinally of said vehicle;
   (g) actuating means interconnecting said other wheel frame and said other end of said main frame for lowering and raising said other end of said main frame to engage said rotary slotting blades with and disengage them from the pavement;
   (h) a motor carried by said main frame; and
   (i) means providing driving connections from said motor to said rotary slotting blades and said actuating means.

6. In a pavement machine, the combination of:
   (a) a wheeled vehicle including frame means supported by front and rear wheel means engageable with the pavement;
   (b) said frame means including a main frame carried by front and rear wheel frames respectively having said front and rear wheel means mounted thereon;
   (c) the front and rear ends of said main frame being independently movable vertically relative to said front and rear wheel frames, respectively;
   (d) means for adjusting the vertical position of the front end of said main frame relative to said front wheel frame;
   (e) adjustable means for limiting downward movement of the rear end of said main frame relative to said rear wheel frame;
   (f) tandem rotary slotting blades mounted on said main frame for rotation about transverse horizontal axes and spaced apart longitudinally of said vehicle;
(g) actuating means interconnecting said rear wheel frame and the rear end of said main frame for lowering and raising the rear end of said main frame to engage said rotary slotting blades with and disengage them from the pavement;
(h) a motor carried by said main frame; and
(i) means providing driving connections from said motor to said rotary slotting blades and said actuating means.

7. In a pavement slotting machine, the combination of:
(a) a wheeled vehicle including frame means supported by front and rear wheel means engageable with the pavement;
(b) said vehicle having a longitudinal centerline and each of said wheel means being laterally symmetrical with respect to said longitudinal centerline;
(c) said front wheel means being a driving wheel means for propelling said vehicle over the pavement with said rear wheel means trailing said front wheel means;
(d) said frame means including a main frame carried by front and rear wheel frames respectively having said front and rear wheel means mounted thereon;
(e) the front and rear ends of said main frame being independently movable vertically relative to said front and rear wheel frames, respectively;
(f) means for adjusting the vertical position of the front end of said main frame relative to said front wheel frame;
(g) adjustable means for limiting downward movement of the rear end of said main frame relative to said rear wheel frame;
(h) tandem rotary slotting blades mounted on said main frame for rotation about transverse horizontal axes and spaced apart along said longitudinal centerline of said vehicle;
(i) actuating means interconnecting said rear wheel frame and the rear end of said main frame for lowering and raising the rear end of said main frame to engage said rotary slotting blades with and disengage them from the pavement;
(j) a motor carried by said main frame; and
(k) means providing driving connections from said motor to said front wheel means, said rotary slotting blades and said actuating means.

8. In a pavement slotting machine, the combination of:
(a) a wheeled vehicle including frame means supported by front and rear wheel means engageable with the pavement;
(b) said vehicle having a longitudinal centerline and each of said wheel means being laterally symmetrical with respect to said longitudinal centerline;
(c) said front wheel means being a driving wheel means for propelling said vehicle over the pavement with with said rear wheel means trailing said front wheel means;
(d) said front wheel means being a steerable wheel means;
(e) said frame means including a main frame carried by front and rear wheel frames respectively having said front and rear wheel means mounted thereon;
(f) the front and rear ends of said main frame being independently movable vertically relative to said front and rear wheel frames, respectively;
(g) means for adjusting the vertical position of the front end of said main frame relative to said front wheel frame;
(h) adjustable means for limiting downward movement of the rear end of said main frame relative to said rear wheel frame;
(i) tandem rotary slotting blades mounted on said main frame for rotation about transverse horizontal axes and spaced apart along said longitudinal centerline of said vehicle;
(j) actuating means interconnecting said rear wheel frame and the rear end of said main frame for lowering and raising the rear end of said main frame to engage said rotary slotting blades with and disengage them from the pavement;
(k) a motor carried by said main frame;
(l) means providing driving connections from said motor to said front wheel means, said rotary slotting blades and said actuating means; and
(m) means for steering said front wheel means.

9. In an apparatus for longitudinally slotting a strip of pavement intermediate the longitudinal edges thereof, the combination of:
(a) guide means transversely spanning the strip of pavement and movable longitudinally therealong in a predetermined direction and provided with two guide wheel means respectively engageable with the longitudinal edges of the strip of pavement;
(b) a wheeled vehicle movable longitudinally along the strip of pavement behind said guide means and including frame means supported by front and rear wheel means engageable with the strip of pavement;
(c) one of said wheel means being a driving wheel means for propelling said vehicle along the strip of pavement in said direction;
(d) one of said wheel means being a steerable wheel means;
(e) tandem rotary slotting blades carried by said frame means for rotation about transverse horizontal axes and spaced apart longitudinally of said vehicle;
(f) actuating means for moving said rotary slotting blades vertically into and out of slotting engagement with the strip of pavement;
(g) a motor carried by said frame means;
(h) means providing driving connections from said motor to said driving wheel means, said rotary slotting blades and said actuating means;
(i) pusher means interconnecting said frame means and said guide means for causing said vehicle to push said guide means longitudinally along the strip of pavement in said direction; and
(j) steering means interconnecting said guide means and said steerable wheel means for steering said steerable wheel means in a direction to cause one of said guide wheel means to bear against the corresponding longitudinal edge of the strip of pavement.

10. In an apparatus for longitudinally slotting a strip of pavement intermediate the longitudinal edges thereof, the combination of:
(a) guide means transversely spanning the strip of pavement and movable longitudinally therealong in a predetermined direction and provided with two guide wheel means respectively engageable with the longitudinal edges of the strip of pavement;
(b) a wheeled vehicle movable longitudinally along the strip of pavement behind said guide means and including frame means supported by front and rear wheel means engageable with the strip of pavement;
(c) one of said wheel means being a driving wheel means for propelling said vehicle along the strip of pavement in said direction;
(d) said front wheel means being a steerable wheel means;
(e) tandem rotary slotting blades carried by said frame means for rotation about transverse horizontal axes and spaced apart longitudinally of said vehicle;
(f) actuating means for moving said rotary slotting blades vertically into and out of slotting engagement with the strip of pavement;
(g) a motor carried by said frame means;
(h) means providing driving connections from said motor to said driving wheel means, said rotary slotting blades and said actuating means;

(i) pusher means interconnecting said frame means and said guide means for causing said vehicle to push said guide means longitudinally along the strip of pavement in said direction; and (j) steering means interconnecting said guide means and said front wheel means for steering said front wheel means in a direction to cause one of said guide wheel means to bear against the corresponding longitudinal edge of the strip of pavement.

11. In an apparatus for longitudinally slotting a strip of pavement intermediate the longitudinal edges thereof, the combination of:

(a) a guide means transversely spanning the strip of pavement and movable longitudinally therealong in a predetermined direction and provided with two guide wheel means respectively engageable with the longitudinal edges of the strip of pavement;

(b) a wheeled vehicle movable longitudinally along the strip of pavement behind said guide means and including frame means supported by front and rear wheel means engageable with the strip of pavement;

(c) said front wheel means being a driving wheel means for propelling said vehicle along the strip of pavement in said direction;

(d) said front wheel means also being a steerable wheel means;

(e) tandem rotary slotting blades carried by said frame means for rotation about transverse horizontal axes and spaced apart longitudinally of said vehicle;

(f) actuating means for moving said rotary slotting blades vertically into and out of slotting engagement with the strip of pavement;

(g) a motor carried by said frame means;

(h) means providing driving connections from said motor to said front wheel means, said rotary slotting blades and said actuating means;

(i) pusher means interconnecting said frame means and said guide means for causing said vehicle to push said guide means longitudinally along the strip of pavement in said direction; and (j) steering means interconnecting said guide means and said front wheel means for steering said front wheel means in a direction to cause one of said guide wheel means to bear against the corresponding longitudinal edge of the strip of pavement.

12. In an apparatus for longitudinally slotting a strip of pavement intermediate the longitudinal edges thereof, the combination of:

(a) guide means transversely spanning the strip of pavement and movable longitudinally therealong in a predetermined direction and provided with two guide wheel means respectively engageable with the longitudinal edges of the strip of pavement;

(b) a wheeled vehicle movable longitudinally along the strip of pavement behind said guide means and including frame means supported by front and rear wheel means engageable with the strip of pavement;

(c) said vehicle having a longitudinal centerline and each of said wheel means being laterally symmetrical with respect to said longitudinal centerline;

(d) said front wheel means being a driving wheel means for propelling said vehicle along the strip of pavement in said direction;

(e) tandem rotary slotting blades carried by said frame means for rotation about transverse horizontal axes and spaced apart along said longitudinal centerline of said vehicle;

(f) actuating means for moving said rotary slotting blades vertically into and out of slotting engagement with the strip of pavement;

(g) a motor carried by said frame means;

(h) means providing driving connections from said motor to said front wheel means, said rotary slotting blades and said actuating means; and (i) pusher means interconnecting said frame means and said guide means for causing said vehicle to push 13. In an apparatus for longitudinally slotting a strip of pavement intermediate the longitudinal edges thereof, the combination of:

(a) guide means transversely spanning the strip of pavement and movable longitudinally therealong in a predetermined direction and provided with two guide wheel means respectively engageable with the longitudinal edges of the strip of pavement;

(b) a wheeled vehicle movable longitudinally along the strip of pavement behind said guide means and including frame means supported by front and rear wheel means engageable with the strip of pavement;

(c) said vehicle having a longitudinal centerline and each of said wheel means being laterally symmetrical with respect to said longitudinal centerline;

(d) said front wheel means being a driving wheel means for propelling said vehicle along the strip of pavement in said direction, and also being a steerable wheel means;

(e) tandem rotary slotting blades carried by said frame means for rotation about transverse horizontal axes and spaced apart along said longitudinal centerline of said vehicle;

(f) actuating means for moving said rotary slotting blades vertically into and out of slotting engagement with the strip of pavement;

(g) a motor carried by said frame means;

(h) means providing driving connections from said motor to said front wheel means, said rotary slotting blades and said actuating means;

(i) pusher means interconnecting said frame means and said guide means for causing said vehicle to push said guide means longitudinally along the strip of pavement in said direction; and (j) steering means interconnecting said guide means and said front wheel means for steering said front wheel means in a direction to cause one of said guide wheel means to bear against the corresponding longitudinal edge of the strip of pavement.

14. In an apparatus for longitudinally slotting a strip of pavement intermediate the longitudinal edges thereof, the combination of:

(a) guide means transversely spanning the strip of pavement and movable longitudinally therealong in a predetermined direction and provided with two guide wheel means respectively engageable with the longitudinal edges of the strip of pavement;

(b) a wheeled vehicle movable longitudinally along the strip of pavement behind said guide means and including frame means supported by front and rear wheel means engageable with the strip of pavement;

(c) said vehicle having a longitudinal centerline and each of said wheel means being laterally symmetrical with respect to said longitudinal centerline;

(d) said front wheel means being a driving wheel means for propelling said vehicle along the strip of pavement in said direction, and also being a steerable wheel means;

(e) tandem rotary slotting blades carried by said frame means for rotation about transverse horizontal axes and spaced apart along said longitudinal centerline of said vehicle;

(f) actuating means for moving said rotary slotting blades vertically into and out of slotting engagement with the strip of pavement;

(g) a motor carried by said frame means;

(h) means providing driving connections from said motor to said front wheel means, said rotary slotting blades and said actuating means;

(i) pusher means interconnecting said frame means and said guide means for causing said vehicle to push said guide means longitudinally along the strip of pavement in said direction;

(j) steering means interconnecting said guide means and said front wheel means for steering said front wheel means in a direction to cause one of said guide wheel means to bear against the correspond- longitudinal edge of the strip of pavement; and (k) two bracing means respectively connected to said guide means adjacent said guide wheel means, and each connected to said frame means adjacent said rear wheel means.

15. In an apparatus for longitudinal slotting a strip of pavement intermediate the longitudinal edges thereof, the combination of:

(a) guide means transversely spanning the strip of pavement and movable longitudinally therealong in a predetermined direction and provided with two guide wheel means respectively engageable with the longitudinal edges of the strip of pavement;

(b) a wheeled vehicle movable longitudinally along the strip of pavement behind said guide means and including frame means supported by front and rear wheel means engageable with the strip of pavement;

(c) said front wheel means being a steerable wheel means;

(d) tandem rotary slotting blades carried by said frame means for rotation about transverse horizontal axes and spaced apart longitudinally of said vehicle;

(e) means for driving said rotary slotting blades;

(f) means interconnecting said frame means and said guide means;

(g) steering means interconnecting said guide means and said front wheel means for steering said front wheel means in a direction to cause one of said guide wheel means to bear against the corresponding longitudinal edge of the strip of pavement; and (h) means for propelling said vehicle and said guide means along the strip of pavement in said direction.

References Cited by the Examiner

UNITED STATES PATENTS

| | | | |
|---|---|---|---|
| 1,977,273 | 10/1934 | Hansen | 104—244.1 |
| 2,349,949 | 5/1944 | Farrell | 299—39 |
| 2,939,691 | 6/1960 | Lewis | 299—39 |
| 3,001,778 | 9/1961 | Tomita et al. | 299—39 |
| 3,007,688 | 11/1961 | Hatcher | 299—39 |

ERNEST R. PURSER, *Primary Examiner.*